(12) United States Patent
Jain et al.

(10) Patent No.: US 10,007,838 B2
(45) Date of Patent: Jun. 26, 2018

(54) MEDIA CONTENT ENRICHMENT USING AN ADAPTED OBJECT DETECTOR

(71) Applicant: Oath Inc., New York, NY (US)

(72) Inventors: Vidit Jain, Karnataka (IN); Sachin Sudhakar Farfade, Karnataka (IN)

(73) Assignee: OATH, INC., New York, NY (US)

( * ) Notice: Subject to any disclaimer, the term of this patent is extended or adjusted under 35 U.S.C. 154(b) by 0 days. days.

(21) Appl. No.: 15/375,868

(22) Filed: Dec. 12, 2016

(65) Prior Publication Data

US 2017/0091530 A1 Mar. 30, 2017

Related U.S. Application Data (63) Continuation of application No. 13/894,814, filed on May 15, 2013, now Pat. No. 9,519,659.

(51) Int. Cl.
| | |
|---|---|
| *G06F 17/30* | (2006.01) |
| *G06K 9/00* | (2006.01) |
| *G06K 9/62* | (2006.01) |
| *G06N 7/00* | (2006.01) |

(52) U.S. Cl.
CPC ... *G06K 9/00228* (2013.01); *G06F 17/30247* (2013.01); *G06K 9/00221* (2013.01); *G06K 9/6256* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 7,840,076 B2 | 11/2010 | Bouguet | |
| 8,489,627 B1 | 7/2013 | Brandt | |
| 8,775,451 B2 | 7/2014 | Galperin | |
| 8,819,024 B1 * | 8/2014 | Toderici | G06F 17/30731 707/740 |
| 2006/0018521 A1 | 1/2006 | Avidan | |
| 2009/0244291 A1 * | 10/2009 | Saptharishi | G06K 9/00771 348/187 |
| 2009/0245573 A1 | 10/2009 | Saptharishi et al. | |
| 2010/0158356 A1 | 6/2010 | Ranzato et al. | |

(Continued)

OTHER PUBLICATIONS

Stark, Michael, Michael Goesele, and Bernt Schiele. "A shape-based object class model for knowledge transfer." Computer Vision, 2009 IEEE 12th International Conference on. IEEE, 2009.*

(Continued)

*Primary Examiner* — Ryan M Gray
(74) *Attorney, Agent, or Firm* — James J. DeCarlo; Greenberg Traurig, LLP (57) ABSTRACT

Disclosed herein are a system, method and architecture for media content enrichment. A visual object detector is trained using a training data set and an existing visual object detector. The newly-adapted visual object detector may be used to detect a visual object belonging to a class of visual object. The existing object detector that is used to train the adapted object detector detects a class of visual objects different from the visual object class detected by the adapted object detector. A media content item depicting a visual object detected using the adapted object detector may be associated with metadata, tag or other information about the detected visual object to enrich the media content item.

20 Claims, 5 Drawing Sheets

(56) References Cited

U.S. PATENT DOCUMENTS

2012/0179704 A1\* 7/2012 Xu ................... G06F 17/30017
  707/766
2012/0321174 A1 12/2012 Tsymbal et al.
2013/0080426 A1 3/2013 Chen et al.
2014/0140610 A1 5/2014 Tu

OTHER PUBLICATIONS

Grauman et al.; "Unsupervised Learning of Categories from Sets of Partially Matching Image Features;" Proceedings of the 2006 IEEE Computer Society Conference on Computer Vision and Pattern Recognition (CVPR 06); 7 pages.

Huang et al.; "Unsupervised Joint Alignment of Complex Images;" University of Massachusetts Amherst; Amherst, MA; ICCV 2007; 8 pages.

Viola and Jones; "Robust Real-Time Face Detection;" International Journal of Computer Vision 57(2), 137-154, 2004 c. 2004 Kluwer Academic Publishers. Manufactured in The Netherlands; IJCV 2004; 18 pages.

\* cited by examiner

MEDIA CONTENT ENRICHMENT USING AN ADAPTED OBJECT DETECTOR

CROSS REFERENCE TO RELATED APPLICATIONS

This application is a continuation of and claims priority from co-pending U.S. patent application Ser. No. 13/894,814, filed May 15, 2013, entitled MEDIA CONTENT ENRICHMENT USING AN ADAPTED OBJECT DETECTOR, which is hereby incorporated by reference.

FIELD OF THE DISCLOSURE

The present disclosure relates to media content enrichment, and more particularly to tagging regions of interest in media content, e.g., image, video, etc., and even more particularly to tagging regions in computer-generated media content.

BACKGROUND

A key strategic direction for a digital media company involves enrichment of multimedia content. An example of multimedia content enrichment is tagging regions, such as regions of interest or other important regions, in the media content. Such tagging may be used in indexing, organizing, and/or searching the multimedia content.

SUMMARY

One example of tagging involves tagging regions containing human faces. With the explosion in the popularity of computer generated imagery in multimedia content, such as movies, videos, television programming, images, games, online avatars, etc., media content items may depict faces and other objects that are not human, e.g., are human-like. An existing human face detector may successfully detect a human face in a media content item by detecting features of a human face in the media content item; however, the existing human face detector trained to detect features of a human face will not be as effective in detecting a non-human face with "human-like" features different from the human features of a human face. There is a for detecting such "human-like" features and other regions of interest in such computer-generated content. By way of one non-limiting example, it would be beneficial to identify Na'vi characters in the movie Avatar, Yoda in the Star Wars sequel, and Chef Anton in the movie Ratatouille. Similarly, it would be beneficial to be able to detect people that are wearing costumes, e.g., masks, in photos and videos. To enrich a media content item, regions of interest detected using an adapted object detector, or adapted object detectors, may be "tagged" or associated with metadata, tag or other information.

The present disclosure seeks to address failings in the art and to provide scalable tagging of multimedia content, which may be used to tag regions of interest in computer generated content. By way of some non-limiting examples, the scalable tagging provided in the present disclosure may be used to tag faces of characters that are nonhuman, masked, and/or have a more diverse or different appearance than human faces. Embodiments of the present disclosure may be used to tag faces in various multimedia content, including without limitation video and images, and may be used to enrich the media content for indexing, organization and/or searching, for example. Embodiments of the present disclosure build one or more object classes of interest in an unsupervised manner.

A method is provided in accordance with one or more embodiments, which method comprises obtaining, via at least one processing unit, a query comprising at least one term to retrieve a plurality of first media content items; retrieving, via the at least one processing unit, the plurality of first media content items using the query and an existing association between the at least one term and each first media content item of the plurality indicating that each of the first media content items of the plurality depicts an object belonging to the first visual object class; generating, via the at least one processing unit, the adapted visual object detector using an existing visual object detector used to detect a second visual object class different from the first visual object class, the adapted visual object detector being generated by retraining the existing visual object detector using the first media content items depicting an object belonging to the first visual object class; and analyzing, via the at least one processing unit, a second media content item of a plurality of second media content items using the adapted visual object detector to determine whether the second media content item depicts a visual object belonging to the first visual object class.

In accordance with another aspect of the present disclosure, a system is provided, which system comprises at least one computing device comprising one or more processors to execute and memory to store instructions to obtain a query comprising at least one term to retrieve a plurality of first media content items; retrieve the plurality of first media content items using the query and an existing association between the at least one term and each first media content item of the plurality indicating that each of the first media content items of the plurality depicts an object belonging to the first visual object class; generate the adapted visual object detector using an existing visual object detector used to detect a second visual object class different from the first visual object class, the adapted visual object detector being generated by retraining the existing visual object detector using the first media content items depicting an object belonging to the first visual object class; and analyze a second media content item of a plurality of second media content items using the adapted visual object detector to determine whether the second media content item depicts a visual object belonging to the first visual object class.

In accordance with one or more embodiments, a computer readable non-transitory storage medium is provided, the computer readable non-transitory storage medium for tangibly storing thereon computer readable instructions that when executed cause at least one processor to obtain a query comprising at least one term to retrieve a plurality of first media content items; retrieve the plurality of first media content items using the query and an existing association between the at least one term and each first media content item of the plurality indicating that each of the first media content items of the plurality depicts an object belonging to the first visual object class; generate the adapted visual object detector using an existing visual object detector used to detect a second visual object class different from the first visual object class, the adapted visual object detector being generated by retraining the existing visual object detector using the first media content items depicting an object belonging to the first visual object class; and analyze a second media content item of a plurality of second media content items using the adapted visual object detector to determine whether the second media content item depicts a visual object belonging to the first visual object class.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for media content enrichment. Embodiments of the present disclosure train a visual object detector using a training data set and an existing visual object detector, the newly-adapted visual object detector may be used to detect a visual object belonging to a class of visual object. The existing object detector that is used to train the adapted object detector detects a class of visual objects different from the visual object class detected by the adapted object detector. A media content item depicting a visual object detected using the adapted object detector may be associated with metadata, tag or other information about the detected visual object to further enrich the media content item.

Embodiments of the present disclosure will be described with reference to images as one example of a media content item; however, it should be apparent that embodiments of the present disclosure may be applied to other types of media content. Additionally, embodiments of the present disclosure will be described herein with reference to a face detector; however, it should be apparent that embodiments of the present disclosure may be applied using another type of object class and/or object class detector.

In accordance with one or more embodiments, an object of interest is detected using a detector created by adapting an existing detector, which existing detector may be useful in detecting an object that is similar to, but different from, the object of interest. By way of a non-limiting example, an animated character's face may be detected using an adult human face detector that is adapted to detect the animated character's face. In accordance with at least one embodiment, an adaptation of an existing detector, e.g., an adult human face detector, is performed in an unsupervised manner, with minimal if any human intervention, using a training data set to generate a newly-adapted object detector, e.g., an animated character's face. In accordance with one or more embodiments, the training data set may comprise media content items depicting a visual object of interest, e.g., a visual object that is to be detected using the adapted detector. In accordance with one or more embodiments, the adapted detector may be used with a tagger to identify a set of tags for an object of interest, e.g., a face, contained in a collection, C, of media content, e.g., a collection of images, which tags may be stored and/or used to index, organize and/or retrieve one or more of content items containing the object of interest.

In accordance with one or more embodiments, a training data set used to adapt an existing detector comprises a plurality of multimedia content items, e.g., images, which undergo a data consolidation process in which the data is jointly aligned. By way of a non-limiting example, data consolidation reduces variation and noise in the training data set. By way of a further non-limiting example, the data consolidation may rescale the pixel intensity for each content item to an average pixel intensity, which average may be determined from a histogram of the pixel intensities of the content items in the training data set. By way of some further non-limiting examples, other aspects that might be aligned during data consolidation include but are not limited to contrast, scheme normalization, size, face coverage, etc.

Figure 1:
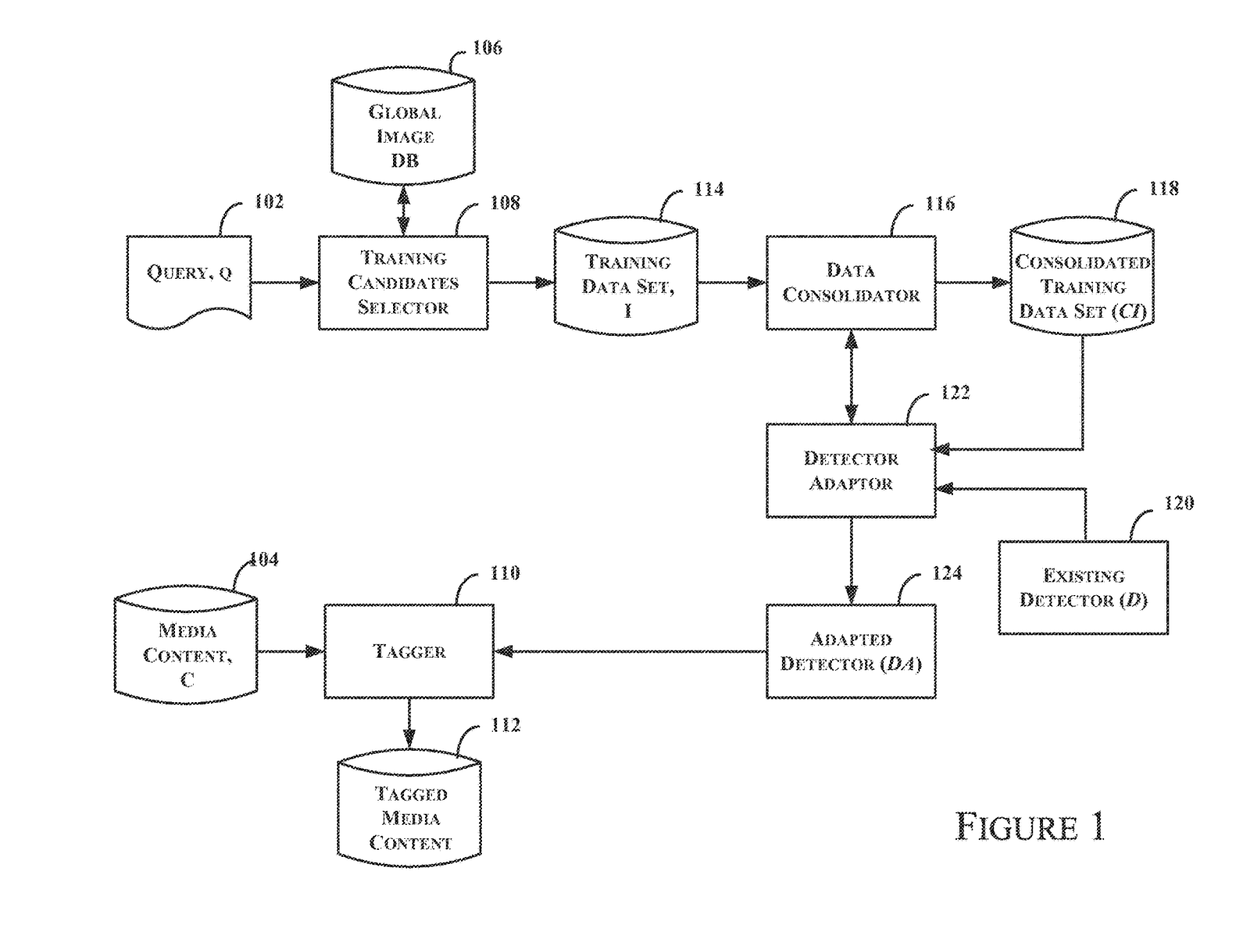
FIG. 1 provides an illustrative system overview of components used in accordance with one or embodiments of the present disclosure.

FIG. 1 provides an illustrative system overview of components used in accordance with one or embodiments of the present disclosure. A collection of media content, 104, e,g., images, and a query 102 are received. The query 102 and content 104 may be provided by a user, such as a system developer, or an end user, for example. Query 102 is input to a selector 108, which retrieves a training data set 114 from database 106, e.g., a global image database. Database 106 comprises media content items associated with metadata, tags, or other information indicating one or more visual objects and/or visual object classes. Selector 108 may be a search engine that retrieves training data set 114 from a content item database 106. In accordance with one or more embodiments, the query comprises terms indicative of a visual object, or class of visual objects, of interest that is to be detected in media content 10.4 using adapted detector 124. By way of a non-limiting example, database 106 may comprise one or more media content items tagged by users, which tags may include one or more terms included in query 102.

Training data set 114 is input to a data consolidator 116, which normalizes, or aligns, characteristics of the media content data of the content items, e.g., images, in training data set 114. The consolidated training data set 118 generated by data consolidator 116 is input to a detector adaptor module, or detector adaptor, 122. An existing detector 120, which is used to detect one object class, is also input to detector adaptor 122. The visual object class detected using existing detector 120 may be similar to but different from the visual object class of interest, e.g., the object class that is to be detected using adapted detector 124.

Detector adaptor 122 generates adapted detector 124 using consolidated training data set 118 to re-train existing detector 120. Adapted detector 124 is input to a component, such as tagger 110, which component receives as input media content 104. Tagger 110 uses adapted detector 124 to detect the visual object of interest, e.g., an animated character's face, and creates one or more tags, metadata or other information. Each tag may contain metadata information corresponding to an object of interest found in a content item from media content 104. By way of a non-limiting example, the "tagging" information may comprise one or more terms from query 102. Tagger 110 may output tagged media content 112 comprising media content items of media content 104 and metadata identifying each object of interest found using adapted detector 124.

Figure 2:
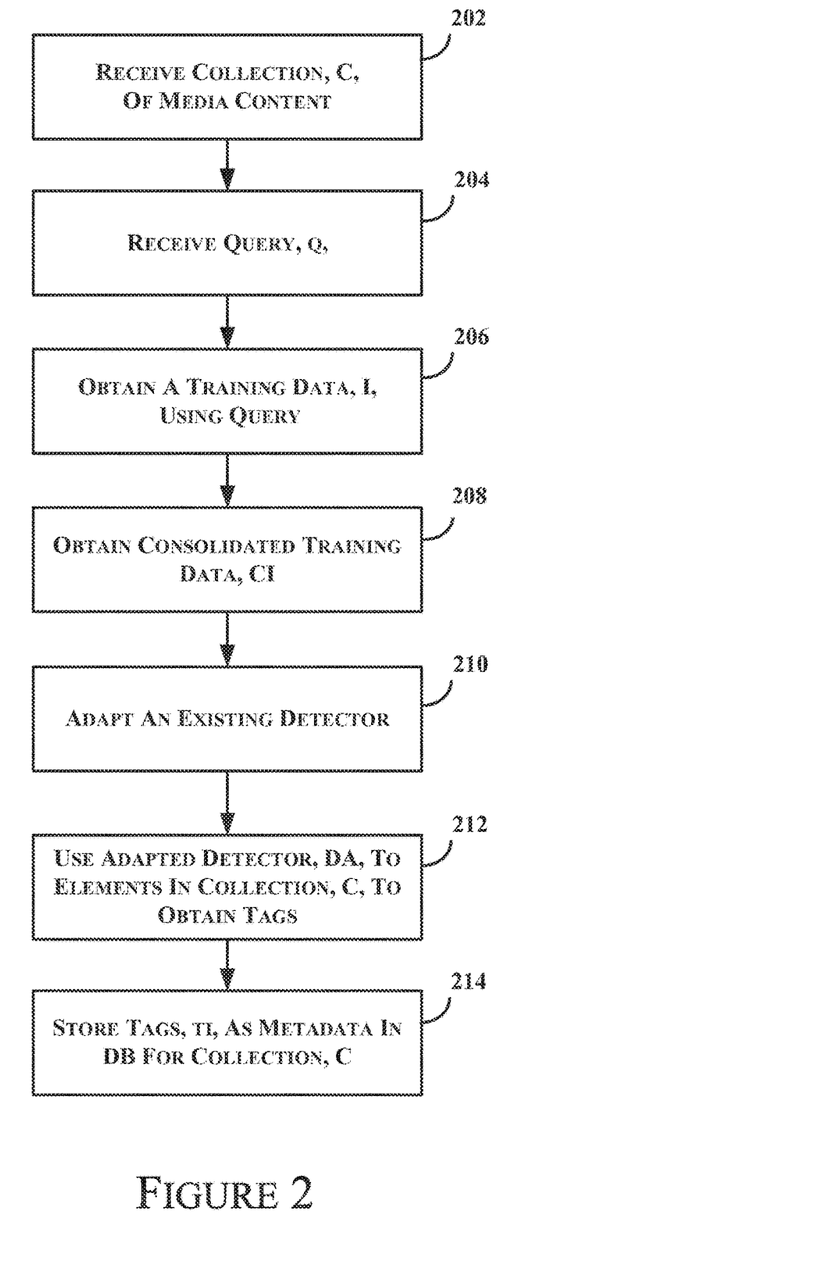
FIG. 2 is illustrative of a process used in accordance with one or more embodiments of the present disclosure.

FIG. 2 is illustrative of a process used in accordance with one or more embodiments of the present disclosure. The process shown in FIG. 2 may be executed by a system such as that shown in FIG. 1, for example.

At steps 202 and 204, a collection, C, of media content items, such as without limitation a collection of images, and a query, q, such as without limitation a name of a character that represents the object to be tagged in C, are received. The collection, C, and query, q, may be received from an end user or otherwise obtained. Collection, C, may be media content 104 and query, q, may be query 102, for example. At step 206, query, q, may be used to retrieve from a global image database, such as without limitation database 106 or other database comprising images, which database is searchable by a search engine to retrieve a set of images, I, e.g., a set of top ranked, e.g., top ranked based on relevance of the image to the query. The set of images, I, may be training data set 114 and may be used as candidates for retraining an existing detector, or model, used tier detection of a visual object class to create a newly-adapted detector, or model, for detecting instances of a visual object of interest in collection, C. By way of a non-limiting example, the existing model, e.g., detector/model 120, might be used to detect an adult human face and the adapted model, e.g., detector/model 124, might be used to detect the face of an animated character whose name is provided in query, q.

The candidate images, I, undergo a data consolidation at step 208. In consolidation, the candidate images, I, may be jointly aligned, e.g., using an unsupervised technique, to reduce variation and noise in the training set. See Huang, Gary B, Jain, Vidit and Learned-Miller, Erik, *Unsupervised Joint Alignment Of Complex Images,* International Conference on Computer Vision, pp. 1-8, 2007, which is incorporated herein by reference. The collection, or set, of consolidated images may be referred to as Cl, e.g., consolidated training data set 118.

At step 210, an existing, e.g., previously-trained, object detector is retrained to create an adapted detector, DA, for use in detecting a visual object, or object class, of interest. The existing detector may be used to detect a similar object class, but may not work well at detecting the object class of interest. At step 212, the adapted detector, DA, e.g., adapted detector 124, may be applied to each of the media content items, ci, in media content item collection, C, to determine whether or not a content item, ci, from media content 104 contains or depicts the object of interest. Where the media content item, ci, is determined to include the object of interest, the media content item may be associated with a tag, it, which may comprise metadata, or other information, identifying the object of interest and/or indicating that the object of interest can be found in the media content item, ci. The tagging information may include one or more terms from query, q, for example. The obtained tags, ti, may be stored as meta-data in a database for annotated media (e.g., tagged images) at step 214.

As disclosed herein, an existing object detector, which is used to detect a first visual object or visual object class, may be used to create another object detector, which is used to detect a second visual object or visual object class. In accordance with one or more embodiments, the existing object detector is retrained, or adapted, to detect the second object or class of objects. The following provides an example in which an existing human adult face detector is adapted to detect another type of face, e,g., a character's face. Embodiments of the present disclosure use an adaptor module such as that shown in FIG. 1, e.g., detector adaptor 122. As shown in FIG. 1, detector adaptor 122 takes consolidated training data set 118 and an existing detector 120 as input and outputs adapted detector 124. In accordance with one or more embodiments, existing detector 120, which is also referred to herein as detector, D, is retrained using training data set 118 to generate adapted detector 124, which is also referred to herein as adapted detector, DA.

In accordance with one or more embodiments, detector D comprises a number of classifiers, e.g., a cascade of classifiers such as and without limitation a Viola-Jones classification cascade which may be used for detecting a visual object or visual object class, e.g., an adult human face, which classification cascade is described in Viola, Paul and Jones, Michael J., *Robust Real-Time Face Detection, International Journal of Computer Vision,* vol. 57, no. 2, pp. 137-154, 2004, which is incorporated herein by reference. Generally, a classifier may be used to analyze a content item to determine whether a feature, e.g., a pattern of pixels, exists in the contain item. A content item may be analyzed by the classifiers in the cascade of classifiers to determine the presence or absence of a number of features.

A classifier typically makes the determination based on presence or absence of one or more features. By way of some examples, a feature may measure the difference in pixel intensity between the region of the eyes and a region across the upper cheeks, and another feature compares the intensities in the eye regions relative to the intensity across the bridge of the nose. Where features that indicate a human face are found in a content item by the cascade of classifiers, a determination may be made that the content item, or a region of the content item, includes or depicts a human face.

A classification cascade structure typically comprises a number of levels or layers, with at least one classifier at each layer/level. Each classifier relies on a presence or absence of one or more features to make its determination. Analysis might continue to a classifier at a next layer/level in the classification structure where a classifier at the immediately preceding level renders a positive determination, e.g., that an item of content being analyzed contains the object of interest. The number of features used by a classifier to make a determination may increase from one layer/level to the next and/or the number of layers/levels used in the structure may be increased to achieve a minimal, acceptable, rate of false positives.

Embodiments of the present disclosure use a cascade of adaptively boosted, or AdaBoost, classifiers, e.g., the existing detector and/or the adapted detector may comprise a cascade of AdaBoost classifiers. See Freund, Y. and Schapire, R., *A Decision—Theoretic Generalization Of On-Line Learning And An Application To Boosting,* Proceedings of the Second European Conference on Computational Learning Theory, pp. 23-37, 1995, which is incorporated herein by reference. Generally, a boosting technique such as AdaBoost may be used to build a strong, accurate classifier by selecting a number of "weak" classifiers. A weak classifier may be a classifier that accurately detects some but not all features. By way of a non-limiting example, a boosting technique may be used to iteratively select a number of classifiers, such that each subsequent iteration addresses a weakness or weaknesses of classifiers selected in a previous iteration. The number of iterations may be dictated by a threshold, e.g., desired minimum or maximum, error rate.

Figure 3:
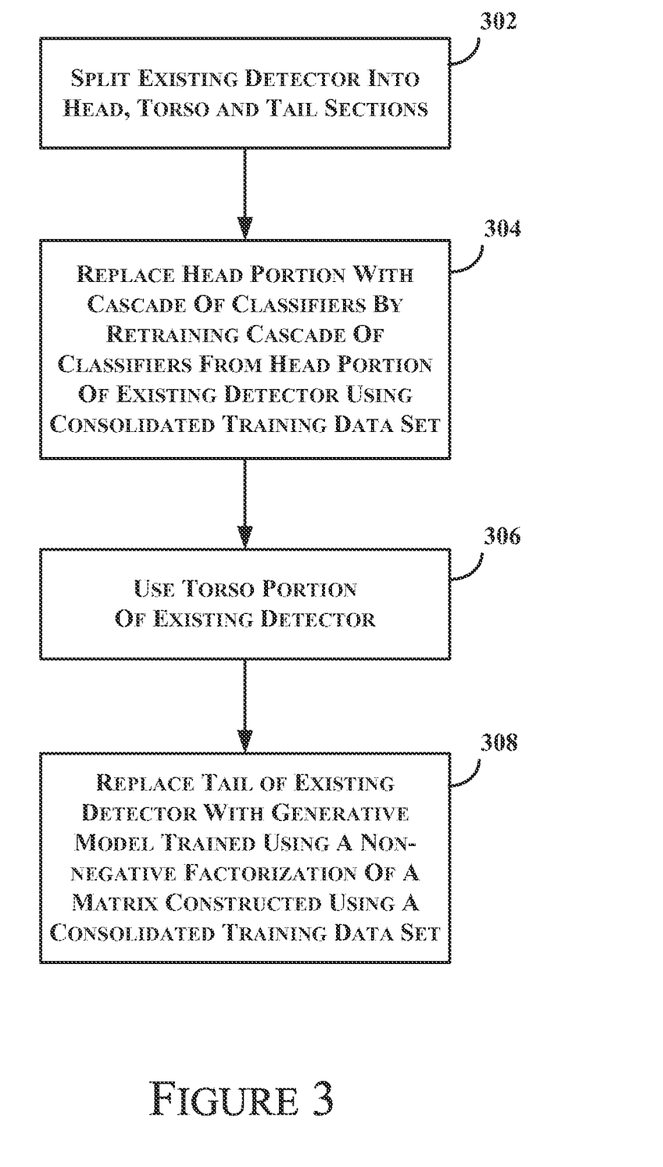
FIG. 3 illustrates a process flow for adapting an existing detector in accordance with one or more embodiments of the present disclosure.

FIG. 3 illustrates a process flow for adapting an existing detector in accordance with one or more embodiments of the present disclosure. By way of a non-limiting example, the existing detector may be a human face detector. At step 302, a cascade of classifiers of existing detector 120 is split into subsets, e.g., head, torso and tail portions, each portion of which comprises a subset of classifiers from the cascade of classifiers of existing detector 120. At step 304, the set of classifiers forming the head of existing detector 120 is retrained to generate a portion of a newly-adapted detector.

By way of a non-limiting example, in adapted detector 124, a newly trained cascade, N, of classifiers replaces the head of existing detector 120. The torso of existing detector 120 remains intact and is used as the torso of adapted detector 124, at step 306. By way of a non-limiting example, the torso comprises a set of classifiers of existing detector 120 that captures stable variations in the appearance of faces or face-like objects. At step 308, the tail of existing detector 120 is replaced by a probabilistic generative model that is based on non-negative matrix factorization learned using data set 118. Modifying the head, according to one or more embodiments, increases recall and modifying the tail, according to embodiments, increases precision of the overall classifier. Additionally, the adaptation is computationally efficient and the resulting adapted detector 124 is of similar complexity as the original, generic face detector 120.

As discussed above, a probabilistic model that is based on non-negative matrix factorization is learned using training data set 118, and the learned probabilistic model replaces the tail of existing detector 120 in creating adapted detector 124. Non-negative matrix factorization is a technique in which a matrix is factored into two matrices. By way of a non-limiting example, a matrix A having n rows and in columns may be factored into two matrices, B and C, where matrix B has n rows and r columns and matrix C has r rows and m columns and r<m. Additionally, the determinant of a residual matrix, U=A−B*C, given by ||U||=||A−B*C||, is as small as possible, and all of the elements in the matrices B and C are non-negative, or greater than or equal to zero.

In accordance with one or more embodiments, a generative model, G, is trained from the non-negative matrix factorization of a matrix constructed from the normalized candidate images, e.g., training data set 110. By way of a non-limiting example, data consolidator 116 normalizes the size of images in training data set 114 so that images in training data set 118 have a size of h×w pixels. In the example, the values of all of the h×w pixels in each of these images are used to construct a single row of matrix A, such that the number of columns in matrix A is the same as the number of pixels in each of the training data set images, i.e., m=h×w. By way of a further non-limiting example, h=w=24, although in general, h and w need not be set to identical values. Matrix A may be used to build model G, as follows:

1. A non-negative matrix factorization of matrix A is performed to obtain the matrices B and C. By way of a non-limiting example, the value of r, the number of columns in matrix B and the number of rows of matrix C, might be a value between 50 and 200.

2. Consider each of the n rows of matrix B as n different vectors. Each of the vectors has r values. Let $b_i$ refer to the $i^{th}$ row of matrix B.

3. For each vector $b_i$, find the k nearest neighbors, e.g., k=10. Let the corresponding distances be denoted by $d_{i1}, d_{i2}, \ldots, d_{ik}$. Compute the standard deviation computed for these k values of distances and refer to it as $\sigma_i$.

4. All of the n vectors $b_i$ and the respective $\sigma_i$, and the matrix C are collectively referred to as the generative model G. A real number value $t_G$ that will be used as a threshold for the score computed for a new test image region is selected.

As discussed above, the tail of existing detector 120 is replaced by the generative model such that the generative model G is applied to a new test image, e.g., an image in media content 104, which has passed through the head and torso of the classification cascade of adapted detector 124. For a new image region x* of size h×w, the new text image may be classified as follows:

1. Determine the r-dimensional vector b* such that ||x*−b*C|| is minimized over different choices for b* and all of the values b* are greater than or equal to zero (in the matrix notation, b* has 1 row and r columns).

2. Compute distance of b* from all $b_i$ in the model. Let these distances be denoted by $d_1^*, d_2^*, \ldots, d_n^*$.

3. Compute the score $$s^* = \sum_{i=1}^{n} \frac{1}{\sqrt{2\pi}\,\sigma_i} - \exp(-d_{i^*}/\sigma_i^2).$$

4. If $s^* > t_G$, accept x*; else, reject x*.

In accordance with one or more embodiments, the generative model determined as discussed above is used to replace a subset, e.g., a torso portion, of the existing detector 120 in the adapted detector 124.

Figure 4:
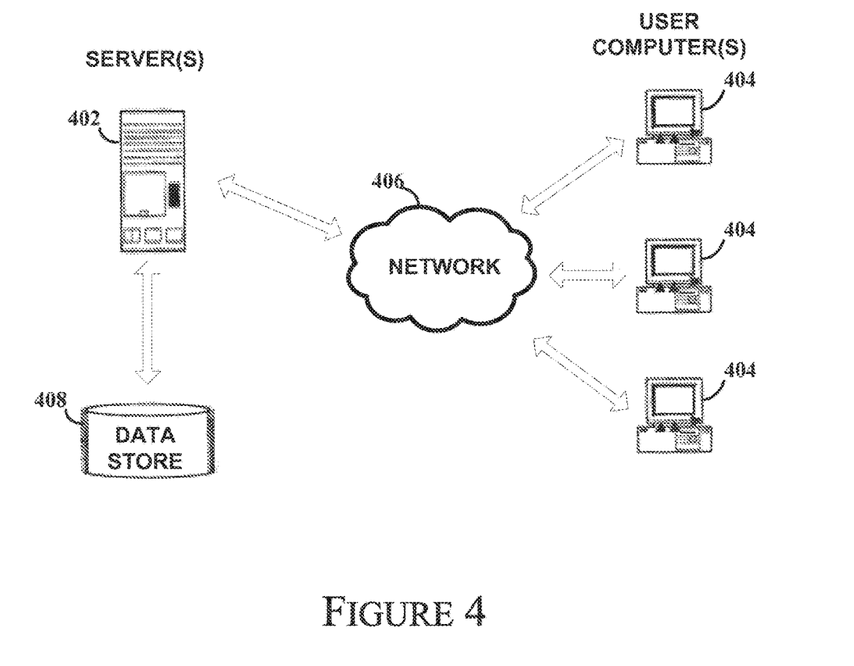
FIG. 4 illustrates some components that can be used in connection with one or more embodiments of the present disclosure.

FIG. 4 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 402 can be configured to execute program code, instructions, etc. to provide functionality in accordance with one or more embodiments of the present disclosure. The same or another computing device 402 and/or computing device 404 can be configured to implement one or more embodiments of the present disclosure. Computing device 402 may be associated with one or more resource data store 104.

Computing device 402 can serve content to user computing devices 404 using a browser application via a network 406. Data store 408, which may include global image database 106, training data set 114, consolidated training data set 118, media content 104 and/or tagged media content 112, and may be used to store program code to configure a computing device 402 to implement one or more embodiments of the present disclosure.

The user computing device 404 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 402 and the user computing device 404 can include one or more processors, memory, a removable media reader, network interface, display and interface, and one or more input devices, e.g., keyboard, keypad, mouse, etc. and input device interface, for example. One skilled in the art will recognize that server 402 and user computing device 404 may be configured in many different ways and implemented using many different combinations of hardware, software, or firmware.

In accordance with one or more embodiments, a computing device 402 can make a user interface available to a user computing device 404 via the network 406. The user interface made available to the user computing device 404 can include content items, or identifiers (e.g., URLs) selected for the user interface in accordance with one or more embodiments of the present invention. In accordance with one or more embodiments, computing device 402 makes a user interface available to a user computing device 404 by communicating a definition of the user interface to the user computing device 404 via the network 406. The user interface definition can be specified using any of a number of languages, including without limitation a markup language such as Hypertext Markup Language, scripts, applets and the like. The user interface definition can be processed by an application executing on the user computing device 404, such as a browser application, to output the user interface on a display coupled, e.g., a display directly or indirectly connected, to the user computing device 404.

In an embodiment the network 406 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 4. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 5:
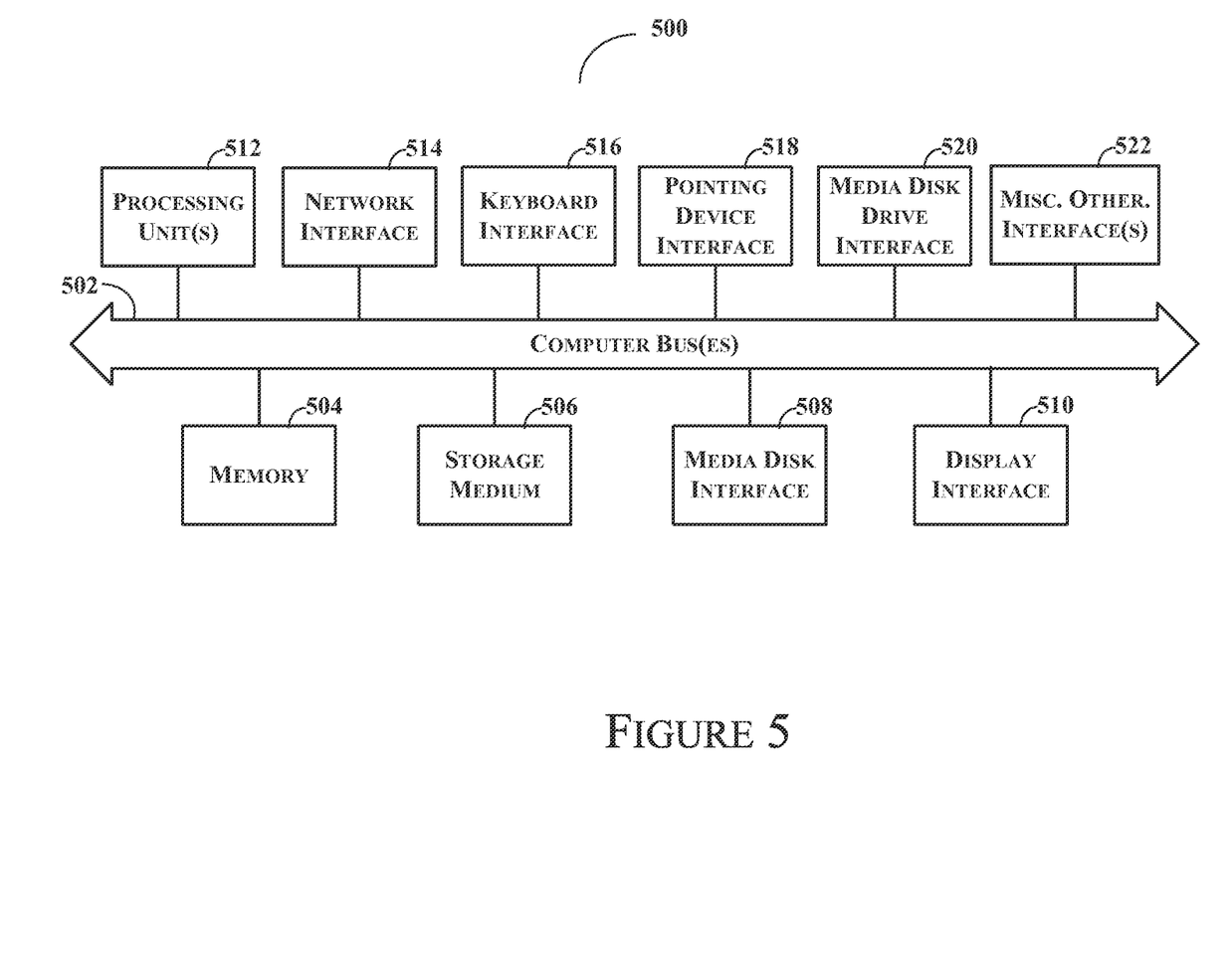
FIG. 5 is a detailed block diagram illustrating an internal architecture of a computing device in accordance with one or more embodiments of the present disclosure.

FIG. 5 is a detailed block diagram illustrating an internal architecture of a computing device, e.g., a computing device such as server 402 or user computing device 404, in accordance with one or more embodiments of the present disclosure. As shown in FIG. 5, internal architecture 500 includes one or more processing units, processors, or processing cores, (also referred to herein as CPUs) 512, which interface with at least one computer bus 502. Also interfacing with computer bus 502 are computer-readable medium, or media, 506, network interface 514, memory 504, e.g., random access memory (RAM), run-time transient memory, read only memory (ROM), etc., media disk drive interface 520 as an interface for a drive that can read and/or write to media including removable media such as floppy, CD-ROM, DVD, etc. media, display interface 510 as an interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process steps, incorporating functionality described herein, e.g., one or more of process flows described herein. CPU 512 first loads computer-executable process steps from storage, e.g., memory 504, computer-readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   obtaining, by a computing device, an existing object detector used to detect a first object class;
   splitting, by the computing device, the existing object detector into portions, the portions of the object detector comprising a head portion, a torso potion and a tail portion, the torso potion of the object detector detecting stable object variations;
   generating, by the computing device, an adapted head portion for use in forming an adapted object detector, generation of the adapted head portion comprising retraining the head portion of the existing object detector;
   generating, by the computing device, an adapted tail portion for use in forming the adapted object detector, generation of the adapted tail portion comprising retraining the tail potion of the existing object detector;
   forming, by the computing device, the adapted object detector using the adapted head portion, the adapted tail portion and the torso portion, the adapted object detector comprising the adapted head portion generated by retraining the head portion of the existing object detector, the adapted tail portion generated by retraining the tail portion of the existing object detector, and the torso portion of the existing object detector as the torso portion of the adapted object detector;
   analyzing, by the computing device, a media content item using the adapted object detector to determine whether the media content item depicts a visual object belonging to a visual object class detected by the adapted object detector.

2. The method of claim 1, the existing object detector is a human face detector.

3. The method of claim 2, the adapted object detector is a non-human face detector.

4. The method of claim 3, the adapted object detector is a non-human face detector for use in detecting a face of an animated character.

5. The method of claim 1, the existing object detector comprising a cascade of classifiers.

6. The method of claim 5, splitting the existing object detector into a head portion, a torso potion and a tail portion further comprising:
   splitting, by the computing device, the cascade of classifiers of the existing object detector into three subsets, the head portion of the existing object detector comprising a first subset of the classifiers of the cascade, the torso portion comprising a second subset of the classifiers of the cascade, and the tail portion comprising a third subset of the classifiers of the cascade.

7. The method of claim 1, the torso portion of the existing object detector is used in the adapted object detector to capture stable variations in visual objects belonging to the visual object class being detected by the adapted object detector.

8. The method of claim 1, the tail portion of the adapted object detector comprising a probabilistic generative model that is based on a non-negative matrix factorization.

9. The method of claim 1, the adapted head portion of the adapted object detector being used to increase recall of the adapted object detector and the adapted tail portion of the adapted object detector being used to increase precision of the adapted object detector.

10. The method of claim 1, a training data set of media content items is used in the generation of the adapted head portion and in the generation of the adapted tail portion, each media content item of the training data set having a number of associated tags indicating that the media content item depicts at least one visual object belonging to the visual object class detected by the adapted object detector.

11. The method of claim 1, the analyzing further comprising:
    determining, by the computing device using the adapted object detector, that the media content item depicts the visual object belonging to the visual object class detected by the adapted object detector; and
    associating, by the computing device, metadata with the media content item identifying the visual object detected by the adapted object detector.

12. A non-transitory computer-readable storage medium tangibly encoded with computer-executable instructions that when executed by a processor associated with a computing device perform a method comprising:
    obtaining an existing object detector used to detect a first object class;
    splitting the existing object detector into three portions, the three portions of the object detector comprising a head portion, a torso potion and a tail portion, the torso portion of the object detector detecting stable variations;
    generating an adapted head portion for use in forming an adapted object detector, generation of the adapted head portion comprising retraining the head portion of the existing object detector;
    generating an adapted tail portion for use in forming the adapted object detector, generation of the adapted tail portion comprising retraining the tail potion of the existing object detector;
    forming the adapted object detector using the adapted head portion, the adapted tail portion and the torso portion, the adapted object detector comprising the adapted head portion generated by retraining the head portion of the existing object detector, the adapted tail portion generated by retraining the tail portion of the existing object detector, and the torso portion of the existing object detector as the torso portion of the adapted object detector;
    analyzing a media content item using the adapted object detector to determine whether the media content item depicts a visual object belonging to a visual object class detected by the adapted object detector.

13. The non-transitory computer-readable storage medium of claim 12, the existing object detector is a human face detector and the adapted object detector is a non-human face detector for use in detecting a face of an animated character.

14. The non-transitory computer-readable storage medium of claim 12, splitting the existing object detector into a head portion, a torso potion and a tail portion further comprising:
splitting, by the computing device, a cascade of classifiers of the existing object detector into three subsets, the head portion of the existing object detector comprising a first subset of the classifiers of the cascade, the torso portion comprising a second subset of the classifiers of the cascade, and the tail portion comprising a third subset of the classifiers of the cascade.

15. The non-transitory computer-readable storage medium of claim 12, the torso portion of the existing object detector is used in the adapted object detector to capture stable variations in visual objects belonging to the visual object class being detected by the adapted object detector.

16. The non-transitory computer-readable storage medium of claim 12, the tail portion of the adapted object detector comprising a probabilistic generative model that is based on a non-negative matrix factorization.

17. The non-transitory computer-readable storage medium of claim 12, the adapted head portion of the adapted object detector being used to increase recall of the adapted object detector and the adapted tail portion of the adapted object detector being used to increase precision of the adapted object detector.

18. The non-transitory computer-readable storage medium of claim 12, a training data set of media content items is used in the generation of the adapted head portion and in the generation of the adapted tail portion, each media content item of the training data set having a number of associated tags indicating that the media content item depicts at least one visual object belonging to the visual object class detected by the adapted object detector.

19. The non-transitory computer-readable storage medium of claim 12, the analyzing further comprising:
determining, by the computing device using the adapted object detector, that the media content item depicts the visual object belonging to the visual object class detected by the adapted object detector; and
associating, by the computing device, metadata with the media content item identifying the visual object detected by the adapted object detector.

20. A computing device comprising:
a processor;
a non-transitory storage medium for tangibly storing thereon program logic for execution by the processor, the program logic comprising:
obtaining logic executed by the processor for obtaining an existing object detector used to detect a first object class;
splitting logic executed by the processor for splitting the existing object detector into portions, the portions of the object detector comprising a head portion, a torso potion and a tail portion, the torso portion of the object detector detecting stable object variations;
generating logic executed by the processor for generating an adapted head portion for use in forming the adapted object detector, generation of an adapted head portion comprising retraining the head portion of the existing object detector;
generating logic executed by the processor for generating an adapted tail portion for use in forming the adapted object detector, generation of the adapted tail portion comprising retraining the tail potion of the existing object detector;
forming logic executed by the processor for forming the adapted object detector using the adapted head portion, the adapted tail portion and the torso portion, the adapted object detector comprising the adapted head portion generated by retraining the head portion of the existing object detector, the adapted tail portion generated by retraining the tail portion of the existing object detector, and the torso portion of the existing object detector as the torso portion of the adapted object detector;
analyzing logic executed by the processor for analyzing a media content item using the adapted object detector to determine whether the media content item depicts a visual object belonging to a visual object class detected by the adapted object detector.

* * * * *